Dec. 15, 1936.  C. B. SPASE  2,064,450
CLUTCH
Original Filed April 4, 1932  2 Sheets-Sheet 1
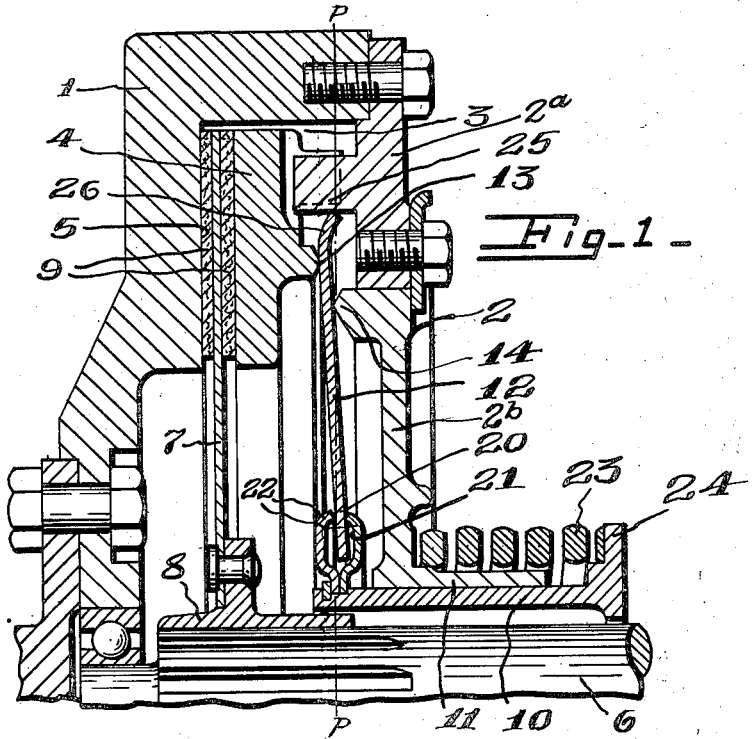
Fig-1-
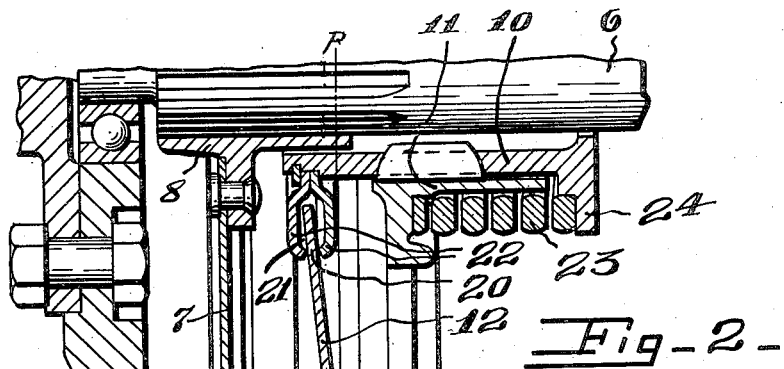
Fig-2-
INVENTOR.
Charles B. Spase
BY Bedell & Thompson
ATTORNEYS.

Dec. 15, 1936.  C. B. SPASE  2,064,450
CLUTCH
Original Filed April 4, 1932  2 Sheets-Sheet 2
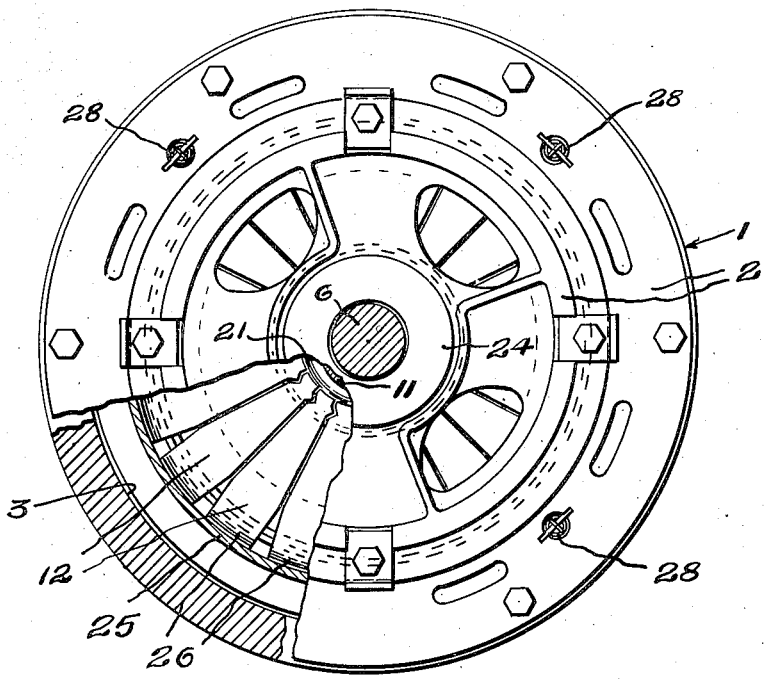
Fig-3-
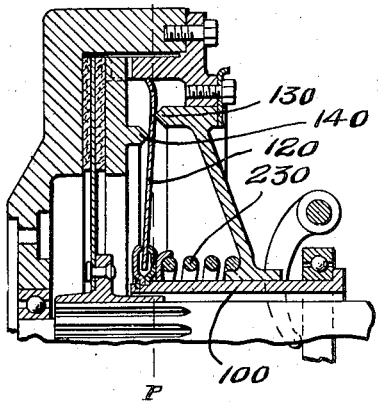
Fig-4-
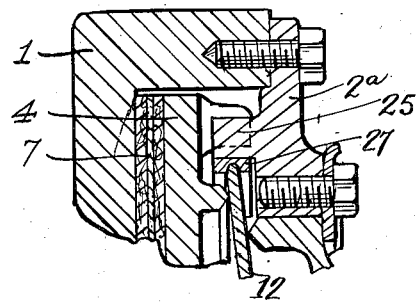
Fig.5.
INVENTOR.
Charles B. Spase
BY
Bodell & Thompson
ATTORNEYS.

Patented Dec. 15, 1936

2,064,450

UNITED STATES PATENT OFFICE 2,064,450

CLUTCH

Charles B. Spase, Nedrow, N. Y., assignor to W. C. Lipe Inc., Syracuse, N. Y., a corporation of New York Application April 4, 1932, Serial No. 602,888
Renewed September 21, 1934

22 Claims. (Cl. 192—68)

This invention relates to friction clutches, such as are used in motor vehicles, and particularly, a clutch embodying outwardly extending, or radial, motion transmitting levers, and has for its object a semi-automatic clutch in which the engagement and disengagement thereof is controlled by the centrifugal force acting on the inner ends of said levers.

It further has for its object, a semi-automatic clutch in which the centrifugal force acting on said levers, when the clutch is disengaged, tends to prevent the engagement of the clutch by the clutch spring when the engine, or the driving member, is accelerated before the clutch is engaged.

It further has for its object an adjusting means, or a clutch lever construction, such as the deflected outer ends of the clutch levers, whereby the amount of the centrifugal force, required to cause the levers to act efficiently in opposition to the clutch spring, can be regulated.

The invention consists in the novel features and in the combinations and constructions hereinafter set forth and claimed.

In describing this invention, reference is had to the accompanying drawings, in which like characters designate corresponding parts in all the views.

Figure 1 is a fragmentary, vertical, sectional view of a clutch embodying this invention where the centrifugal force of the driving member, or flywheel of the engine, causes the levers to effectively act in opposition to the clutch spring when it is disengaged to hold it disengaged, or to hold it from sudden reaction, the parts being shown in their engaged position.

Figure 2 is a sectional view, similar to Figure 1, the parts being shown in their disengaged position, Figures 1 and 2 taken together being a vertical, sectional view with part of the levers shown in engaged position, and part in disengaged position.

Figure 3 is a fragmentary rear elevation of parts seen in Figures 1 and 2.

Figure 4 is a view, similar to Figure 1, in which the clutch is provided with levers of the second class instead of levers of the first class, as in Figure 1.

Figure 5 is a fragmentary sectional view illustrating a modified form of the abutment means for the extreme outer ends of the clutch levers.

This clutch comprises generally, a driving member, as the flywheel of the internal combustion engine of the vehicle, a pressure ring rotatable with the driving member and movable toward and from an abutment surface formed on the driving member, as the bottom of a cylindrical recess in the driving member, a driven element including a shaft and clutch means, as a clutch plate rotatable with the shaft and extending between the pressure ring and the abutment surface of the flywheel, a collar, or sleeve, slidable axially of the shaft, and motion transmitting and multiplying levers extending outwardly relatively to the shaft, said levers bearing on the pressure ring and being fulcrumed on the driving member in the rear of the pressure ring, and being coupled at their inner ends to the sleeve, said levers being so arranged that their inner ends are movable toward and from the plane of the fulcrum when the clutch is shifted from engaged to declutched position, or vice-versa, and normally arranged at one side of said plane when the clutch is in one of said positions and shiftable toward said plane when in the other of said positions, and these inner end portions having sufficient weight to be acted upon by the centrifugal force of the flywheel to cause them to move away from said plane under the centrifugal force. The levers merely press against, or are capable of separating from their fulcrums and from the pressure ring. By "plane of the fulcrum" is meant a plane containing the fulcrum and arranged at a right angle to the axis of the shaft, or the clutch.

In Figures 1 and 2, a semi-automatic clutch is shown in which the centrifugal action of the inner ends of the levers tends to hold the clutch disengaged when the clutch is shifted to disengaged position, the levers acting under the centrifugal force against the clutch spring.

1 designates the driving element, this including the usual flywheel of the internal combustion engine of the vehicle, and a back plate structure 2 which closes the rear end of the cylindrical recess 3 formed in the flywheel. The back plate structure comprises an outer annular section 2ª which is secured to the flywheel, and an inner axially adjustable discoidal section 2ᵇ on which the fulcrum for the clutch levers is formed. The back plate structure forms no part of this invention.

4 is the pressure ring which is located in the recess 3 and interlocked with the flywheel to rotate therewith, and shift axially thereof, the pressure ring being movable toward and from an abutment surface 5 at the bottom of the recess.

The driven element includes the clutch shaft 6, and clutch means, as a plate or disk 7 having a hub 8 mounted on the shaft 6 to rotate therewith and shift axially thereof, the disk 7 extending between the pressure ring 4 and the abutment surface 5 and being provided with friction disks 9 on opposite sides thereof.

10 designates a throw-out sleeve slidable axially of the shaft, this being mounted in a hub 11 of the back plate section 2$^b$ and extending to the front and rear, or inner and outer sides of the back plate.

12 designates a series of motion transmitting clutch levers extending outwardly relatively to the shaft 6 and coupled at their inner ends to the sleeve to shift therewith and pressing at their outer ends against the pressure ring, and also toward their outer ends against a fulcrum on the back plate structure. These levers are, in the embodiment of my invention illustrated in Figures 1 and 2, of the first class, and the fulcrum 14 is located farther toward the outer ends of the levers than toward the inner ends, and the levers thrust against an annular rib or bearing surface 13 on the rear side of the pressure ring, so that the levers are not anchored either to the fulcrum, or rib, but are capable of separating therefrom.

The inner ends of the levers are however, coupled at 20 to the inner end of the sleeve 10, and are here shown as extending into a groove 21 formed by a pair of rings 22 secured to the inner end of the sleeve 10 in any suitable manner not forming part of this invention. As the levers here shown are of the first class, they are normally arranged, when the clutch is engaged, at the rear side of the fulcrum plane indicated by the line P—P, Figure 1, and are movable to the front side of said plane when the clutch is disengaged by operating the clutch pedal and throw-out yoke, not shown, to thrust the sleeve 10 inwardly. The position of the levers when the clutch is thrown out is shown in Figure 2.

23 designates a clutch spring thrusting against the back plate structure at one end, and against an annular flange or collar 24 at the rear end of the throw-out sleeve. The spring thus tends to throw the sleeve 10 rearwardly and move the inner ends of the levers rearwardly and engage the clutch. When however, the sleeve 10 is moved inwardly, the inner ends of the levers are moved to the forward side of the plane P—P so that the centrifugal force acting on the levers tends to move them farther forwardly and act in opposition to the spring 23, the force applied being dependent upon the weight of the inner ends of the levers which are shifted from one side to the other of the fulcrum plane.

In order to obtain the most effective weight of the levers, without unduly weighting them, or increasing their length, the levers are provided with a second fulcrum point on the driving member at their extreme outer ends, the levers acting on this fulcrum point only when the clutch is disengaged, and the flywheel is spinning.

As here illustrated, the back plate structure 2 is provided with an annular flange 25 on its inner side with which the extreme outer ends of the levers slidably engage, and in order to regulate the amount of centrifugal force, or the effect of the centrifugal force on the levers, these ends are deflected as at 26 away or rearward from the fulcrum plane.

As seen in Figure 5, the outer ends of the levers, instead of seating directly against the flange 25, may be seated in a member, as a ring, or segments thereof, slidably mounted on the inner surface of the flange, this ring being designated 27. The sliding movement is limited by the ring 27 engaging the back plate.

The clutch shown in Figure 1 is what is called a push-in clutch, because the throw-out sleeve moves inwardly when the clutch is disengaged, and the clutch spring effects a rearward thrust on the throw-out sleeve. In so-called pull out clutches, where the throw-out sleeve moves outwardly to throw out the clutch and the force of the spring acts inwardly on the throw-out sleeve, levers of the second class are used, as shown in Figure 4, instead of levers of the first class, as shown in Figure 1.

In Figure 4, 120 designates the levers; 100 the throw-out sleeve; 230 the clutch spring, the levers being fulcrumed at their outer ends at 130 and pressing short of their inner ends at 140 against the pressure ring. In this form shown in Figure 4, the inner end portions of the levers pass to the rear side of the fulcrum plane when the clutch is disengaged. In either form shown in Figures 1 and 4, when the clutch is thrown out, the centrifugal force, in case the engine is being accelerated, acting on the inner ends, tends to throw the inner ends farther outwardly, and thus cause the levers to apply a force in opposition to the clutch spring, this force tending to resist the reaction of the clutch spring to engage the clutch.

In the form shown in Figures 1 and 4, the amount of opposition, or resistance, is regulated by the deflecting of the outer ends of the levers at 26 relatively to the fulcrum plane so that the levers can be arranged to entirely oppose the reaction of the spring under a predetermined centrifugal force. This deflection of the levers causes the levers to fulcrum at their extreme outer ends on the annular abutment, when shifted slightly outwardly under the centrifugal force when the clutch is disengaged and hence, engage the abutment at a more advantageous angle relatively to the levers, than if the levers were straight. That is, if the levers were fulcrumed at their outer ends at points in line with the levers. The deflection also in effect thickens the outer ends of the levers 12, so that they will always have engagement or be within the annular abutment 25, as when the clutch faces wear and the outer ends of the levers would approach the edge of the annular abutment 25 and the wear might be to such an extent that the levers would slip off the free edge of the abutment 25. The pressure ring is usually acted upon by one or more springs 28 acting in opposition to the levers and tending to withdraw the pressure ring.

Drivers of motor vehicles, particularly trucks and busses, oftentimes try to start the vehicle by jumping it from a standing start, particularly when it is off the road in a rough place, and in other situations where starting is difficult, by accelerating the engine to a high speed while the clutch is thrown out and then suddenly, letting in the clutch. This results in straining of the clutch, gears, and other mechanism, and oftentimes results in stripping the teeth from gears. By reason of the arrangement of the levers of this clutch, when the engine is so accelerated with the clutch thrown out, the centrifugal force holds the clutch disengaged until the engine is decelerated to a speed where the clutch can safely be engaged.

What I claim is:

1. In a clutch the combination of a driving member having an abutment, and a driven member, a pressure ring opposed to the abutment rotatable with the driving member and shiftable axially thereof, the driven member including a shaft, and clutch means mounted on the shaft and extending between the pressure ring and the abutment, motion transmitting and multiplying levers extending outwardly relatively to the shaft, the levers slidably fulcruming on the driving member and slidably pressing on the pressure ring, and a sleeve shiftable axially of the shaft, and the inner ends of the levers being connected to the sleeve to move therewith and to tend to move outward under the centrifugal force, the levers being arranged to shift from one side to the other of the fulcrum plane and being arranged relative to the fulcrum so that the centrifugal force on the inner ends of the levers tends to hold the clutch engaged when it is engaged, and tends to hold it disengaged when disengaged, and a spring acting on the levers tending to hold the clutch engaged.

2. In a clutch the combination of a driving member having an abutment, a driven member, a pressure ring rotatable with and shiftable axially of the driving member, the driven member including a shaft, and clutch means mounted thereon and extending between the pressure ring and the abutment, motion transmitting and multiplying levers extending outwardly relatively to the shaft and slidably fulcrumed on the driving member and slidably pressing on the pressure ring, a sleeve movable axially of the shaft, the inner ends of the levers being connected to the sleeve to move therewith and to tend to move outward under the centrifugal force, and a clutch spring acting on the sleeve and the levers, and tending to actuate the levers to apply pressure to the pressure ring, said levers being arranged relatively to the sleeve to apply a force in opposition to the spring under the centrifugal action of the driving member and the levers only when the clutch is disengaged.

3. In a clutch the combination of a driving member having an abutment, a driven member, a pressure ring rotatable with and shiftable axially of the driving member, the driven member including a shaft, and clutch means mounted thereon and extending between the pressure ring and the abutment, motion transmitting and multiplying levers extending outwardly relatively to the shaft and fulcrumed on the driving member and acting on the pressure ring, a sleeve movable axially of the shaft, the inner ends of the levers being connected to the sleeve to move therewith, and a clutch spring acting on the sleeve and the levers, and tending to actuate the levers to apply pressure to the pressure ring, said levers being arranged relatively to the sleeve to apply a force in opposition to the spring under the centrifugal action of the driving member and the levers when the clutch is disengaged, the driving member having an abutment means on which the ends of the levers fulcrum when the clutch is disengaged.

4. In a clutch the combination of a driving member having an abutment, a driven member, a pressure ring rotatable with and shiftable axially of the driving member, the driven member including a shaft, and clutch means mounted thereon and extending between the pressure ring and the abutment, motion transmitting and multiplying levers extending outwardly relatively to the shaft and fulcrumed on the driving member and acting on the pressure ring, a sleeve movable axially of the shaft, the inner ends of the levers being connected to the sleeve to move therewith, and a clutch spring acting on the sleeve and the levers, and tending to actuate the levers to apply pressure to the pressure ring, said levers being arranged relatively to the sleeve to apply a force in opposition to the spring under the centrifugal action of the driving member and the levers when the clutch is disengaged, the driving member having an abutment means on which the ends of the levers fulcrum when the clutch is disengaged, the outer ends being deflected out of the plane of the levers and the fulcrum plane in a direction opposite to the movement of the inner ends of the levers during the declutching operation.

5. In a clutch the combination of a driving member having an abutment, a driven member, a pressure ring rotatable with and shiftable axially of the driving member, the driven member including a shaft, and clutch means mounted thereon and extending between the pressure ring and the abutment, motion transmitting and multiplying levers extending outwardly relatively to the shaft and slidably fulcrumed on the driving member and slidably pressing on the pressure ring, a sleeve movable axially of the shaft, the inner ends of the levers being connected to the sleeve to move therewith and free to throw outwardly relatively to the sleeve under the centrifugal force, and a clutch spring acting on the sleeve and tending to actuate the levers to apply pressure to the pressure ring, said levers being normally arranged with their inner ends on one side of the fulcrum plane when the clutch is engaged, and to shift their inner ends from one side to the other of the fulcrum plane when the clutch is disengaged, whereby the inner ends of the levers under the centrifugal action thereof due to turning of the driving member applies a force in opposition to the clutch spring when the clutch is disengaged.

6. In a clutch the combination of a driving member having an abutment, a driven member, a pressure ring rotatable with and shiftable axially of the driving member, the driven member including a shaft, and clutch means mounted on the shaft and extending between the pressure ring and the abutment, motion transmitting and multiplying levers of the first class extending radially relatively to the shaft, a throw-out sleeve shiftable axially of the shaft, a clutch spring acting on the throw-out sleeve to press it in one direction, the levers slidably pressing at their outer ends against the pressure ring and being coupled at their inner ends to the sleeve to shift axially therewith and being free to shift outwardly relatively to the sleeve under the action of a centrifugal force and slidably fulcrumed between their ends and near their outer ends on the driving member in the rear of the pressure ring, said levers being normally arranged with their inner ends in, or in the rear of, the fulcrum plane and shiftable in front of said plane.

7. In a clutch the combination of a driving member having an abutment, a driven member, a pressure ring rotatable with and shiftable axially of the driving member, the driven member including a shaft, and clutch means mounted on the shaft and extending between the pressure ring and the abutment, motion transmitting and multiplying levers of the first class extending radially relatively to the shaft, a throw-out sleeve shiftable axially of the shaft, a clutch spring acting on the throw-out sleeve to press it in one direction to engage the clutch, the levers pressing at their outer ends against the pressure ring and being coupled at their inner ends to the sleeve, and fulcrumed between their ends and near their outer ends on the driving member, said levers being movable by the sleeve to carry their inner ends in front of the fulcrum plane, the driving member having an abutment means with which the outer ends of the levers slidably engage during the normal movement of the levers, and on which they fulcrum when the clutch is released.

8. In a clutch the combination of a driving member having an abutment, a driven member, a pressure ring rotatable with and shiftable axially of the driving member, the driven member including a shaft, and clutch means mounted on the shaft and extending between the pressure ring and the abutment, motion transmitting and multiplying levers of the first class extending radially relatively to the shaft, a throw-out sleeve shiftable axially of the shaft, and a clutch spring acting on the throw-out sleeve to press it in one direction, the levers pressing at their outer ends against the pressure ring and being coupled at their inner ends to the sleeve and fulcrumed between their ends and near their outer ends on the driving member, said levers being movable by the sleeve to carry their inner ends in front of the fulcrum plane, the driving member having an annular abutment with which the outer ends of the levers slidably engage during the normal movement of the levers and on which they fulcrum when the clutch is released, the outer ends of the levers being deflected in a direction opposite to the movement of the inner ends when the clutch is declutched.

9. In a clutch the combination of a driving member having an abutment, a driven member, a pressure ring rotatable with and shiftable axially of the driving member and opposed to the abutment, the driven member including a shaft, and clutch means mounted on the shaft and extending between the pressure ring and said abutment, motion transmitting and multiplying levers extending outwardly relatively to the shaft, and a sleeve slidable axially of the shaft, the levers slidably fulcruming on the driving member and slidably pressing against the pressure ring, and having their inner ends coupled to the sleeve to move therewith and shift outwardly relatively thereto under the action of the centrifugal force, the levers having their inner ends movable from one side of the plane of the fulcrum to the opposite side thereof, and the clutch being engaged when the levers are on one side and declutched when the levers are on the other side, and a clutch spring acting on the sleeve.

10. In a clutch the combination of a driving member having an abutment, a driven member, a pressure ring rotatable with and shiftable axially of the driving member and opposed to the abutment, the driven member including a shaft, and clutch means mounted on the shaft and extending between the pressure ring and said abutment, motion transmitting and multiplying levers of the first class extending outwardly relatively to the shaft, and a sleeve slidable axially of the shaft, the levers pressing against the pressure ring at their outer ends and being fulcrumed on the driving member between their ends and toward their outer ends and connected to the sleeve at their inner ends, the levers having their inner end portions normally arranged on the rear side of said plane and movable to the front side thereof when the clutch is disengaged, the levers being mounted to shift endwise outwardly under the centrifugal force, and means for fulcruming the levers at their outer ends when so thrown outwardly when the clutch is disengaged.

11. In a clutch the combination of a driving member having an abutment, a driven member, a pressure ring rotatable with and shiftable axially of the driving member and opposed to the abutment, the driven member including a shaft, and clutch means mounted on the shaft and extending between the pressure ring and said abutment, motion transmitting and multiplying levers of the first class extending outwardly relatively to the shaft, and a sleeve slidable axially of the shaft, the levers pressing against the pressure ring at their outer ends and being fulcrumed on the driving member between their ends and toward their outer ends and connected to the sleeve at their inner ends and having their inner end portions normally arranged on the rear side of said plane and movable to the front side thereof when the clutch is disengaged, said levers being slidably engaged at their fulcrum points and the pressure ring and with the sleeve, whereby they are free to shift radially outwardly under the action of the centrifugal force, and means for fulcruming the extreme outer ends of the levers to the driving member when the clutch is disengaged.

12. In a clutch the combination of a driving member having an abutment, a driven member, a pressure ring rotatable with and shiftable axially of the driving member toward and from the abutment, the driven member including a shaft, and clutch means mounted on the shaft and extending between the pressure ring and said abutment, levers extending outwardly relatively to the shaft and pressing against the pressure ring and fulcrumed on the driving member in the rear of the pressure ring, the levers being separable from their fulcrums and from the pressure ring and slidably engaged therewith, a sleeve slidable axially of the shaft, the inner ends of the levers being coupled to the sleeve to shift therewith and free to shift outwardly radially relatively to the sleeve under the action of the centrifugal force, and means for slidably fulcruming the outer ends of the levers to the driving member when the clutch is disengaged.

13. In a clutch the combination of a driving member having an abutment, a driven member, a pressure ring rotatable with and shiftable axially of the driving member toward and from the abutment, the driven member including a shaft, and clutch means mounted on the shaft and extending between the pressure ring and said abutment, levers extending outwardly relatively to the shaft and pressing against the pressure ring and fulcrumed on the driving member in the rear of the pressure ring, the levers being separable from their fulcrums and from the pressure ring and slidably engaged therewith, a sleeve slidable axially of the shaft, the inner ends of the levers being coupled to the sleeve to shift therewith and free to shift outwardly radially relatively to the sleeve under the action of the centrifugal force, and means for slidably fulcruming the extreme outer ends of the levers to the driving member, a clutch spring acting on the sleeve to normally press the same in such direction as to engage the clutch, and the inner ends of said levers being arranged on one side of the fulcrum plane when the clutch is engaged, and shiftable to the other side of said plane when disengaged.

14. In a clutch the combination of a driving member having an abutment, a driven member, a pressure ring rotatable with and shiftable axially of the driving member toward and from the abutment, the driven member including a shaft, and clutch means mounted on the shaft and extending between the pressure ring and said abutment, levers of the first class extending outwardly relatively to the shaft and pressing against the pressure ring and fulcrumed on the driving member in the rear of the pressure ring, the levers being separable from their fulcrums and from the pressure ring, a sleeve slidable axially of the shaft, the inner ends of the levers being coupled to the sleeve to shift therewith, means for fulcruming the outer ends of the levers to the driving member when the clutch is disengaged, a clutch spring acting on the sleeve to normally press the same in such direction as to engage the clutch, and the inner ends of said levers being movable to the front side of the fulcrum plane when the clutch is disengaged, the extreme outer ends of the levers being curved away from said fulcrum plane.

15. In a clutch, the combination of driving and driven friction members, mechanism for engaging and disengaging said members comprising spring means tending to engage the clutch members, a throw-out collar and motion transmitting and multiplying levers operated thereby and arranged to be acted upon by the centrifugal force when the driving member is rotating and being shiftable into a position, whereby the centrifugal force thereof acts in opposition to the spring means when the clutch is disengaged, and in conjunction with the spring means when the clutch is engaged.

16. In a clutch, the combination of driving and driven friction members and mechanism for engaging and disengaging said members and controlling the engagement and disengagement thereof including spring means acting to engage the clutch members, a throw-out collar, and motion transmitting and multiplying levers operated thereby and extending in a general radial direction relatively thereto and being fulcrumed near their outer ends on the driving member and having their longer arms extending toward the throw-out collar, whereby they are subject to greater centrifugal action than the arms beyond the fulcrum, said longer arms being movable to one side of the fulcrum plane when the clutch is disengaged and to the opposite side when the clutch is engaged and being so located and movable relative to the fulcrum plane that the centrifugal force of the levers acts in opposition to the spring means when the clutch is disengaged and in conjunction with the spring means when the clutch is engaged.

17. In a clutch, the combination of a driving member having an abutment, a driven member, a pressure ring opposed to the abutment, rotatable with the driving member and shiftable axially thereof, the driven member including a shaft and a clutch element mounted on the shaft and extending between the pressure ring and the abutment, spring means effective on the pressure ring to hold the clutch engaged, motion transmitting levers extending outwardly relatively to the shaft and fulcruming on the driving member and pressing on the pressure ring, a sleeve shiftable axially of the shaft, the inner ends of the levers being connected to the sleeve to move therewith and be shifted thereby, the inner arms of the levers being movable to one side of the fulcrum plane when operated by the sleeve to release the clutch, whereby the centrifugal force effective on the inner arms of the levers acts in opposition to the spring means and tends to hold the clutch disengaged, and being movable to the opposite side of the fulcrum plane, when the clutch is engaged, whereby the centrifugal force effective on the inner arms of the levers acts in conjunction with the spring means to hold the clutch engaged.

18. In a clutch, the combination of a driving member having an abutment, a driven member, a pressure ring opposed to the abutment rotatable with the driving member and shiftable axially thereof, the driven member including a shaft and a clutch element mounted on the shaft and extending between the pressure ring and the abutment, spring means effective on the pressure ring to hold the clutch engaged, motion transmitting levers extending outwardly relatively to the shaft and fulcruming on the driving member and pressing on the pressure ring, a sleeve shiftable axially of the shaft, the inner ends of the levers being connected to the sleeve to move therewith and be shifted thereby, the levers being movable to one side of the fulcrum plane when operated by the sleeve to release the clutch, whereby the centrifugal force effective on the inner arms of the levers acts in opposition to the spring means and tends to hold the clutch disengaged and being movable to the opposite side of the fulcrum plane, when the clutch is engaged, whereby the centrifugal force effective on the inner arms of the levers acts in conjunction with the spring means to hold the clutch engaged, said spring means acting on the pressure ring through the sleeve and the levers.

19. In a clutch, the combination of axially alined driving and driven friction members and mechanism for engaging and disengaging said members including a pressure plate, spring means tending to engage the clutch members, a throw-out collar, and substantially straight motion transmitting and multiplying levers, said levers being fulcrumed on the driving member and pressing on the pressure plate toward their outer ends, whereby the inner arms of the levers are the longer arms, said inner arms inclining out of the fulcrum plane from their fulcrum points and said arms being arranged to shift outwardly about the fulcrum points under the action of the centrifugal force acting on the inner straight arms when the clutch is being engaged, said inner straight arms shifting under the action of the centrifugal force thereon only, in conjunction with the spring means in an arc diverging outwardly relatively to the axis of the clutch, as the speed of rotation increases, whereby the centrifugal force effective only on the straight inner arms of the levers tends to act in conjunction with the spring means to hold the clutch engaged and compensate for wear of the clutch and consequent decrease in the effect of the spring means, and the amount of pressure between the clutch members remain always at least a predetermined minimum.

20. In a clutch, the combination of driving and driven friction members, mechanism for engaging and disengaging said members comprising spring means tending to engage the clutch members, a throw-out collar and motion transmitting and multiplying levers operated thereby and arranged to be acted upon by the centrifugal force when the driving member is rotating and being shiftable into a position, whereby the centrifugal force thereof acts in opposition to the spring means when the clutch is disengaged, and in conjunction with the spring means when the clutch is engaged, said levers being mounted to have an outward endwise movement in a radial direction, and abutment means rotatable with the driving member, with which the extreme outer ends of the levers engage.

21. In a clutch, the combination of driving and driven members, mechanism for engaging and disengaging said members comprising a pressure ring rotatable with the driving member, a throw-out collar, motion transmitting and multiplying levers operated by the throwout collar and coacting with the pressure ring, and fulcruming on the driving member, the levers being mounted to have a slight endwise outward movement under the centrifugal force, when the driving member is rotating, and spring means acting through the levers and pressure ring to hold the clutch engaged, said levers being also arranged to be acted upon by the centrifugal force and shiftable into a position whereby the centrifugal force thereof acts in opposition to the spring means, when the clutch is disengaged and in conjunction with the spring means, when the clutch is engaged, and abutment means rotatable with the driving member and arranged to engage the extreme outer ends of the levers.

22. In a clutch, the combination of a driving member having an abutment, a driven member, a pressure ring, opposed to the abutment, rotatable with the driving member and shiftable axially thereof, the driven member including a shaft, and clutch means mounted on the shaft and extending between the pressure ring and the abutment, motion transmitting and multiplying levers extending outwardly relatively to the shaft, the levers slidably fulcruming on the driving member and on the pressure ring and mounted to have a radial shifting movement relative to the driving member and the pressure ring, and a sleeve shiftable axially of the shaft, the inner ends of the levers being connected to the sleeve to move therewith, the levers being so arranged that their inner ends move away from the fulcrum plane during the disengaging of the clutch and their inner ends are located to one side of said plane when the clutch is disengaged in such position that the centrifugal force acting on the inner ends of the levers tends to hold the clutch disengaged.

CHARLES B. SPASE.